US006885695B1

(12) United States Patent
Coniglione

(10) Patent No.: US 6,885,695 B1
(45) Date of Patent: Apr. 26, 2005

(54) MULTI-MODE IFF RECEIVER ARCHITECTURE

(75) Inventor: Joseph P. Coniglione, Holbrook, NY (US)

(73) Assignee: BAE Systems Information and Electronic Systems Integration, Inc., Greenlawn, NY (US)

(*) Notice: Subject to any disclaimer, the term of this patent is extended or adjusted under 35 U.S.C. 154(b) by 688 days.

(21) Appl. No.: 09/659,870

(22) Filed: Sep. 13, 2000

(51) Int. Cl.[7] .................. G01S 13/78; H04B 1/707; H04B 1/10

(52) U.S. Cl. .............. 375/147; 375/340; 375/349; 342/45; 455/143

(58) Field of Search .................. 375/147, 316, 375/340, 346, 349, 350; 342/45; 455/143, 303

(56) References Cited

U.S. PATENT DOCUMENTS

| 4,646,097 A | * | 2/1987 | King .................. 342/95 |
| 5,199,109 A | * | 3/1993 | Baker .................. 455/161.2 |
| 5,471,509 A | * | 11/1995 | Wood et al. .................. 375/350 |
| 5,796,772 A | | 8/1998 | Smith et al. |
| 6,295,461 B1 | * | 9/2001 | Palmer et al. .................. 455/557 |

FOREIGN PATENT DOCUMENTS

EP 0 905 528 3/1999

OTHER PUBLICATIONS

European Patent Office, Communication dated May 23, 2003, and Search Report on EP Application No. 01 30 7192.
A.A. Ghirardi, Radio & Television Receiver Circuitry and Operation, (Rinehart Books 1951), pp. 238–241.
U.L. Rohde, et al., Communications Receivers—Principles and Design (McGraw–Hill 1988), pp. 49–53.
GEC–Marconi Hazeltine Corporation, Proposal 3–6057, pp. 2–17 to 2–27 (May 17, 1999).

* cited by examiner

Primary Examiner—Khai Tran
Assistant Examiner—David B. Lugo
(74) Attorney, Agent, or Firm—Law Office of Leo Zucker

(57) ABSTRACT

A transponder receiver for detecting different radio frequency (RF) interrogation mode signals having relatively wide and narrow bandwidths about a common RF center or carrier frequency. A front end stage of the receiver has a preselector with a wide band RF filter for passing both of the wide and the narrow bandwidth interrogation mode signals about the RF center frequency, and a mixer for converting signals from the preselector to frequencies within an intermediate frequency (IF) band. A first IF channel has a narrow band IF filter with a pass band sufficiently wide to pass first IF signals corresponding to the narrow bandwidth interrogation mode signals, but to reject signals corresponding to undesired interfering signals at frequencies near the narrow bandwidth interrogation mode signals. A second IF channel has a wide band IF filter with a pass band sufficiently wide to pass second IF signals corresponding to the desired wide bandwidth interrogation mode signals. The receiver may be incorporated in a transponder for operation in narrow IFF Modes 1–4, C and S, and in wide IFF Mode 5, with optimum performance in all modes.

22 Claims, 5 Drawing Sheets

MULTI-MODE IFF RECEIVER ARCHITECTURE

BACKGROUND OF THE INVENTION

1. Field of the Invention

This invention relates to a multi-mode radio frequency (RF) receiver architecture.

2. Discussion of the Known Art

The ability to distinguish reliably between friendly and hostile approaching aircraft, is extremely important. So-called identification-friend-from-foe (IFF) systems, e.g., the Mark X IFF system, employ a single interrogation frequency (1,030 MHz) and a single reply frequency (1,090 MHz) with a standard reply code. Three coded interrogations, designated Modes 1, 2 and 3 can be selected, wherein each interrogation has a pulse spacing of 3, 5 or 8 μsec corresponding in order to the selected mode.

An airborne transponder replies with a single pulse for Modes 1 and 3, and a pulse-pair with 16 μsec spacing for Mode 2. A coder unit enables variable coded replies to be generated providing a Special Identity Feature (SIF), thus allowing a ground controller quickly to determine a particular aircraft's designation or function. Mark X SIF/IFF systems have been used in most military aircraft since 1959, and the system also serves as an aid to civil air traffic control as part of the Air Traffic Control Radar Beacon System (ATCRBS). Transponders used on civil aircraft use Mode 3 IFF, with the Mode designation "3/A" to connote common military/civil usage.

Present "Mark XII" systems operate in Modes 1, 2, 3/A, 4 and C, all of which use defined patterns of pulse amplitude modulation (PAM). Also specified are Mode S that uses phase shift keying (PSK) modulation, and Mode 5 sing spread spectrum modulation over a relatively wide bandwidth (typically 16 MHz) that is greater than the data rate.

As mentioned, current IFF systems call for transponder receivers to operate at a single center frequency of 1,030 MHz. Since 1981, a Joint Tactical Information Distribution System (JTIDS), also known as the Multi-Functional Information Distribution System (MIDS), provides military forces with both communications and navigation functions for deployment on aircraft and ships. MIDS operates on 51 frequencies in a 960 to 1215 MHz band. Because MIDS signals employ spread spectrum modulation (frequency hopping and phase coding) techniques, they represent potential interfering signals to IFF transponders having receivers tuned at 1,030 MHz, notwithstanding the two closest MIDS frequencies are each 22 MHz away from 1,030 MHz, i.e., at 1,008 MHz and at 1,052 MHz.

Specifically, since emitted MIDS signals use spread spectrum modulation, broadband noise generated by a MIDS transmitter may be within the passband of an IFF transponder receiver. To meet this problem, transponder receivers have incorporated both narrow band RF preselectors and narrow band intermediate frequency (IF) channels to achieve reliable interrogation signal detection in the presence of MIDS signal interference. But certain performance parameters such as pulse fidelity, phase distortion, intersymbol interference and receiver group delay have bene compromised, however. And, while a narrow band receiver front end may allow Mark XII and Mode S interrogating signal waveforms to be detected reliably while rejecting MIDS signal interference, such an approach is incompatible with Mode 5 IFF spread spectrum applications which require a much larger receiver bandwidth for full processing gain. The spread spectrum nature of Mode 5 does, however, make those emissions less susceptible to noise produced by unrelated MIDS signals transmissions.

Accordingly, there is a need for a transponder receiver that can detect and process both wide and narrow band interrogation mode signals reliably in the presence of potential interference, wherein the processing of the wide band mode signals is not compromised by portions of the receiver that are used for processing of the narrow band mode signals.

SUMMARY OF THE INVENTION

According to the invention, a multi-mode receiver for detecting desired ratio frequency (RF) signals having relatively wide and narrow bandwidths about a common RF center or carrier frequency, includes a front end stage having an input adapted to connect with an antenna responsive to the desired RF signals, a preselector for amplifying the signals input by the antenna and having a wide band RF filter with a pass band sufficient to pass both of the desired wide and narrow bandwidth signals about the center RF frequency, and a mixer for converting signals output by the preselector to frequencies within an intermediate frequency (IF) band.

A first IF channel coupled to an output of the front end stage has a narrow band IF filter with a pass-band of sufficient width to pass first IF signals corresponding to the desired narrow bandwidth signals, but to reject signals corresponding to undesired interfering signals at frequencies in the vicinity of the desired narrow bandwidth signals. A second IF channel coupled to an output of the front end stage has a wide band IF filter with a pass band of sufficient width to pass second IF signals corresponding to the desired wide bandwidth signals.

According to one aspect of the invention, the first IF channel is coupled to the output of the front end stage through the wide band IF filter of the second IF channel, and one or more processors coupled to outputs of the first and the second IF channels are configured to process the first and the second IF signals simultaneously.

According to another aspect of the invention, the second IF channel includes a limiter coupled to an output of the wide band IF filter, and the wide band IF filter is configured to reject potentially interfering signals by an amount sufficient to prevent the limiter from being captured by the interfering signals.

For a better understanding of the invention, reference is made to the following description taken in conjunction with the accompanying drawing and the appended claims.

DETAILED DESCRIPTION OF THE INVENTION

Figure 1:
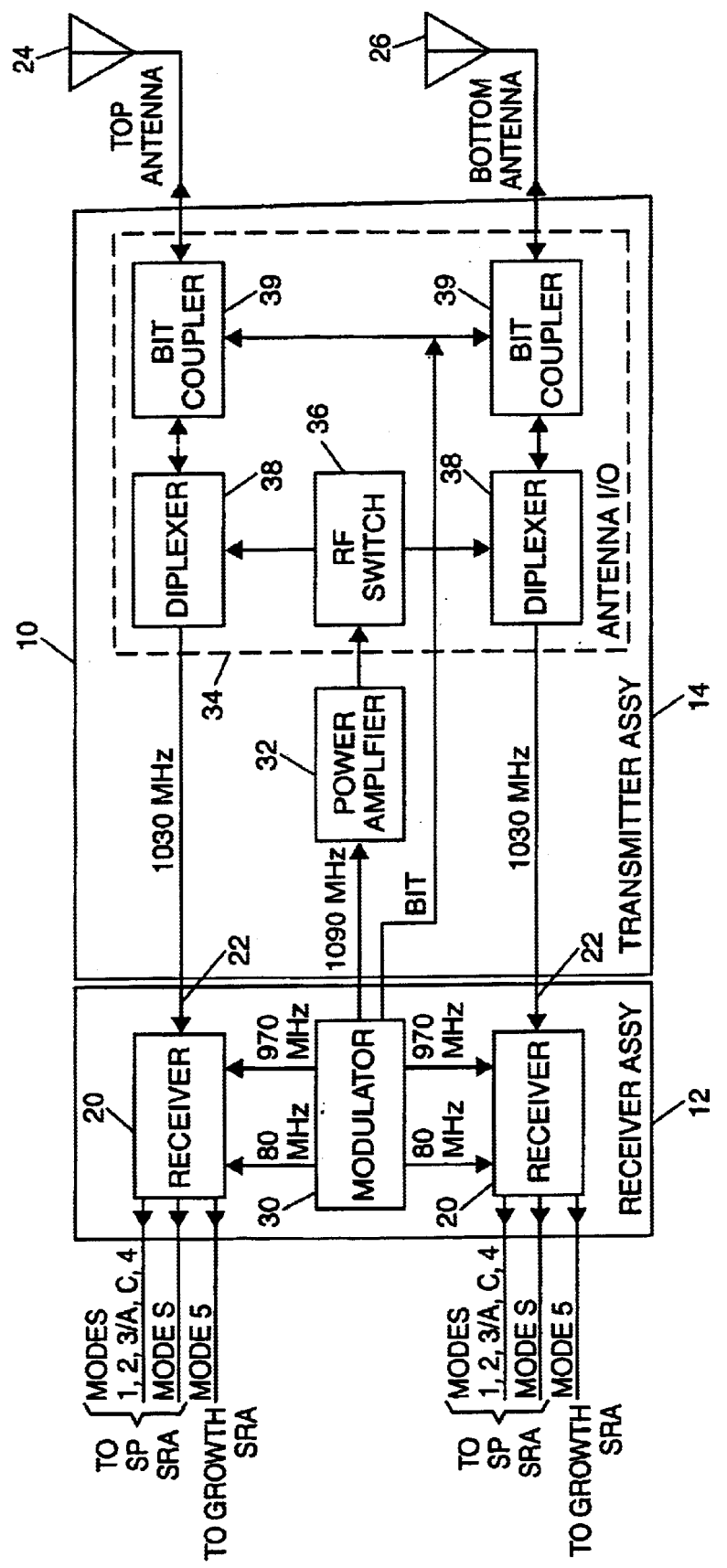
FIG. 1 is a schematic block diagram of an IFF transponder including receivers according to the invention.
Figure 2:
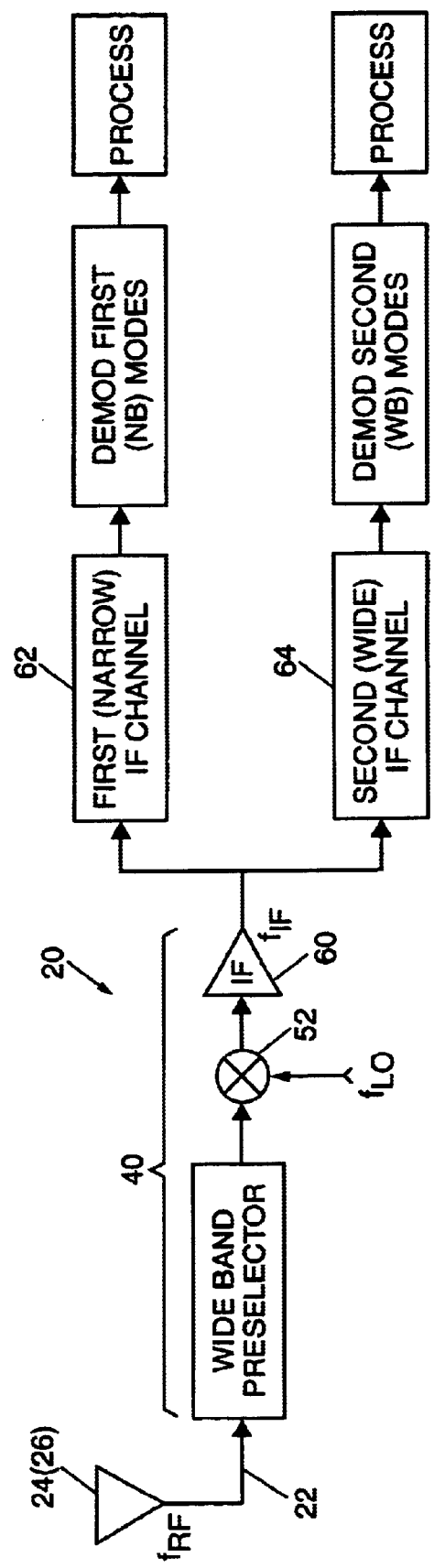
FIG. 2 is an overall block diagram of one of the receivers in the transponder of FIG. 1.

FIG. 1 is a functional block diagram of a transponder 10 including a receiver assembly 12 and a transmitter assembly 14. The receiver assembly 12 includes two substantially identical receivers 20, each with an input terminal 22 adapted for coupling to a separate receiving antenna 24 or 26 for diversity performance. For example, a top antenna 24 associated with one of the receivers, and a bottom antenna 28 associated with the other receiver, may be deployed at corresponding top and bottom positions on an aircraft body. Each receiver 20 is configured to respond, for example, to desired Mark XII SIF Modes 1, 2, 3/A, C and Mode 4, as well as to desired Mode S and Mode 5 interrogating signal waveforms. An overall block diagram of one of the receivers 20 is given in FIG. 2.

The receiver assembly 12 also has a modulator 30, which provides frequency generation for each of the receivers, and waveform modulation for the transmitter assembly 14. The transmitter assembly 14 includes a power amplifier 32, and an antenna input-output (I/O) interface 34 including an RF switch 36 coupled between an output of the power amplifier 32 and each of two selectable diplexers 38. Each diplexer 38 is coupled to an associated one of the antennas 24, 26, through a corresponding bit coupler 39, and each coupler 39 is driven by a bit output of the modulator 30.

Figure 3:
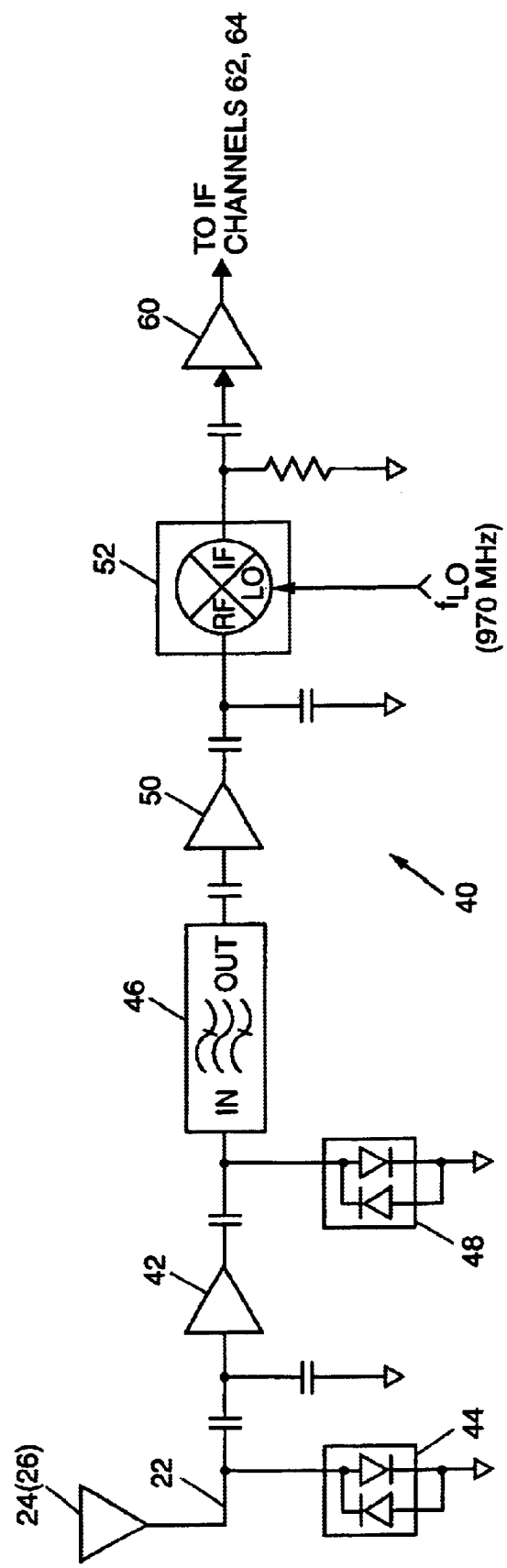
FIG. 3 is a schematic block diagram of a front end stage in the receiver of FIG. 2.

As shown in FIG. 3, the antenna input terminal 22 of each receiver 20 is coupled to an input of a front end stage 40. The stage 40 comprises, for example, a first RF amplifier 42 with a first set of input overload limiting diodes 44, and a preselector filter 46 whose input is coupled to an output of first RF amplifier 42 and a second set of overload limiting diodes 48. The first RF amplifier 42 may comprise a low noise (e.g., 2.6 dB noise figure), high dynamic range (IP3=+ 36 dBm) silicon bipolar surface mount MMIC amplifier.

The filter 46 can be, for example, a six-resonator, 8-mm ceramic filter. The number of resonators establishes a desired bandwidth and selectivity, while the resonator size assures low insertion loss. Filter 46 has a pass band centered at 1,030 MHz with typically 65 dB rejection at the nearest MIDS frequencies of 1008 and 1052 MHz. The 3-dB bandwidth of filter 46 is typically 20 MHz, and an output of filter 46 is coupled to an input of a second RF amplifier 50. The characteristics of filter 46 are chosen to ensure that the second RF amplifier 50 will not produce distortion components that may exceed the receiver's thermal noise floor.

The first RF amplifier 42 and filter 46 are dominant in establishing an overall receiver noise figure of about 8 dB maximum. The overall 3-dB bandwidth of the front end 40 is typically about 20 MHz, providing 65 dB rejection to those MIDS signals nearest the receiver's center frequency. An output of the second RF amplifier 50 is coupled to a down-converting mixer 52 within the front end stage 40. The mixer 52 generates a 60 MHz intermediate frequency (IF) band at its output, in response to a 970 MHz local oscillator input signal supplied from the modulator 30.

The output of the mixer 52 is coupled to an IF amplifier 60. The amplifier 60 is typically a low noise, high dynamic range (IP3=26 dBm) operational amplifier. Amplifier 60 also provides a proper terminating impedance for the mixer 52, as well as an optimal source impedance for first and second IF channels 62, 64. Each of the IF channels is coupled at its input to an output of the front end stage 40.

Figure 4:
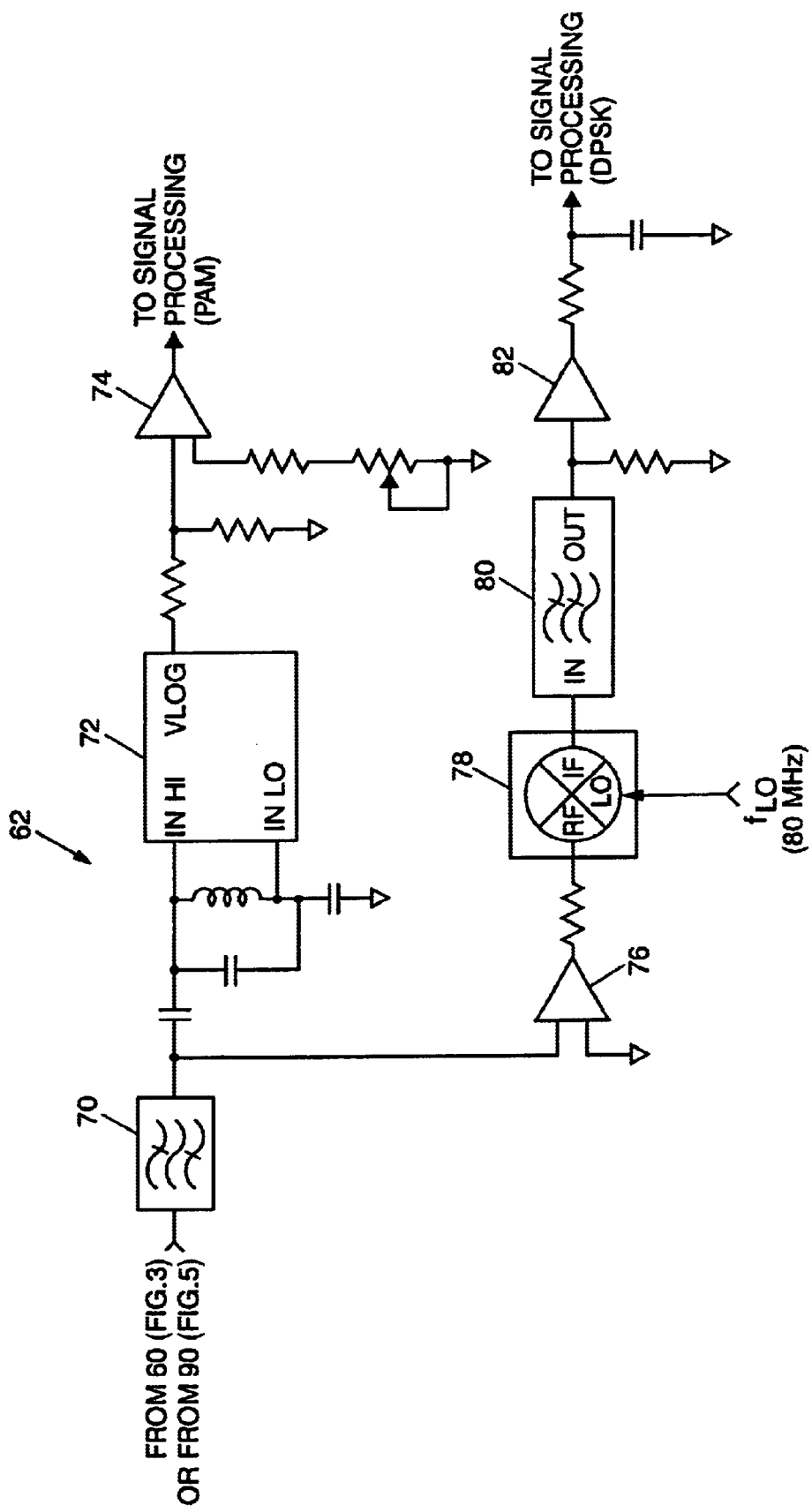
FIG. 4 is a schematic block diagram of a first intermediate frequency (IF) channel in the receiver of FIG. 2.

The first IF channel 62, shown in FIG. 4, includes a first IF filter 70. The filter 70 has a typical 3-dB bandwidth of 7.5 MHz, and a rejection of 80 dB at the nearest (converted) MIDS frequencies. The combination of the front end stage 40 and the first IF filter 70 thus provides a total of, e.g., 145 dB attenuation at the nearest MIDS converted frequencies, and ensures that worst case MDS RF spectral interference will remain below the receiver's noise floor.

The output of the first IF filter 70 is applied to an input of a log amplifier 72, which has a 72-dB logging range for detection of Mark XII mode, pulsed amplitude modulated interrogation signals. An output of the log amplifier 72 is applied to an input of a signal processor (not shown) through a video filter and buffer amplifier 74.

Down-converted Mode S (DPSK) signals at the output of the first IF filter 70 are applied to an input of a limiter 76 which has, e.g., a 100-dB limiting range. An output of the limiter 76 is down-converted, e.g., by 20 MHz, by a mixer 78 to which an 80 MHz LO signal is applied from the modulator 30. The second down-converted by 20 MHz enables received Mode S signals to interface easily with an associated signal processor, while still preserving the information bandwidth. The output of the mixer 78 is coupled to the signal processor through a zonal filter 80 and a limiting amplifier 82. The zonal filter 80 serves two purposes. First, it confines the spectral energy of the limited signal, and, second, it provides any needed rejection from the 80 MHz local oscillator that feeds the mixer 78.

Figure 5:
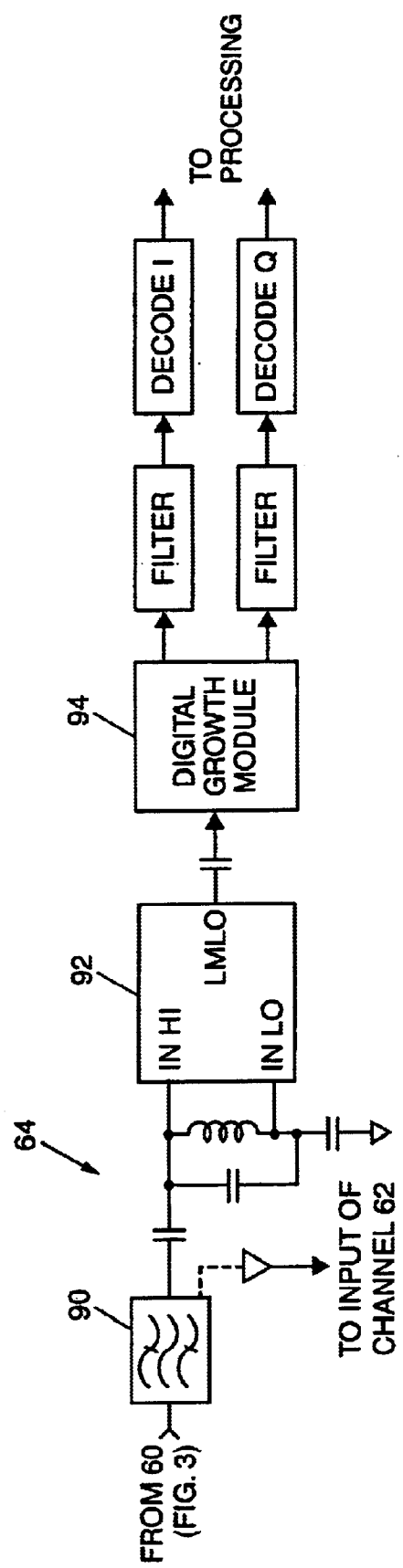
FIG. 5 is a schematic block diagram of a second IF channel in the receiver of FIG. 2.

The second IF channel 64, shown in FIG. 5, enables the receiver 20 to receive and process the wider band, spread spectrum Mode 5 interrogation signals in the absence of relatively narrow band (e.g., 7-MHz) filtering that is used in the first IF channel 62 to optimize detection of other mode signals. A wide band (typically 18 MHz) filter 90 has its input coupled directly to an output of the 60 MHz IF amplifier 60 in the front end stage. An output of the filter 90 is coupled to a limiter 92, and the wide band filter 90 is configured to reject potential MIDS signal interference sufficiently to prevent the limiter 92 from being captured by a MIDS signal. An output of the limiter 92 supplies down-converted, spread spectrum Mode 5 signals to a digital growth module 94. The module 94 operates to quantize, digitize, and quadrature de-modulate the Mode 5 signals. The de-modulated signals are applied to a bank of digital matched filters for detection, wherein the filters are matched to a defined Mode 5 waveform. Because of this, any detected MIDS signal energy is "spread" over a wide bandwidth effectively reducing MIDS interference even further.

As shown in FIG. 5, the wide band filter 90 may have a second output port which is coupled to the input port of the narrow band filter 70 of the first IF channel 62 in FIG. 4. Such an arrangement may serve to equalize the overall response time of the transponder 10 to various modes of interrogation signals, regardless of the IF channel through which the signals are detected and demodulated.

The selectivity of the overall receiver 20 is determined by the first RF amplifier 42, filter 46, second RF amplifier 50, and the IF amplifier 60. The front end filter 46 is centered 1030 MHz, with a 3-dB bandwidth of, e.g., 22 MHz and a constant group delay over a 12 MHz bandwidth. The first IF filter 70 is, e.g., a 6-pole lumped element Chebyshev filter centered at 60 MHz with a 3-dB bandwidth of 7.5 MHz, an 80-dB bandwidth of 44 MHz, and ultimate out of band rejection of 85 dB from 5 to 30 MHz and 92 to 300 MHz.

As mentioned, Mode 5 signal information is spread over a bandwidth greater than its data rate, and an overall Mode 5 receiver bandwidth should be greater than 12 MHz to process the Mode 5 waveform efficiently. Prior receiver architectures channeled Mode 5 signals through stages having bandwidths too narrow to realize the full capability of Mode 5. The present receiver architecture allows optimum Mode 5 performance without compromising MIDS signal rejection in any of the receiver operating modes.

While the foregoing description represents preferred embodiments of the invention, it will be obvious to those skilled in the art that various changes and modifications may be made without departing from the spirit and scope of the invention pointed out by the following claims.

I claim:

1. A multi-mode receiver for detecting desired radio frequency (RF) signals having relatively wide and narrow bandwidth about a common RF center or carrier frequency, comprising:

a front end stage having an antenna input adapted to connect with an antenna responsive to signals over a RF band that includes the desired RF signals, a preselector for amplifying the signals input by the antenna and including a wide band RF filter having a pass band sufficient to pass both of the desired wide and narrow bandwidth signals about the center RF frequency, and a mixer for converting signals output by the preselector to frequencies within an intermediate frequency (IF) band;

a first IF channel coupled to an output of the front end stage and including a narrow band IF filter having a pass band of sufficient width for passing first IF signals corresponding to the desired narrow bandwidth signals to an output of the first IF channel, while rejecting signals corresponding to undesired interfering signals at frequencies in the vicinity of the desired narrow bandwidth signals;

a second IF channel coupled to the output of the front end stage and having a web band IF filter with a pass band of sufficient width for passing second IF signals corresponding to the desired wide bandwidth signals to an output of the second IF channel; and one or more processors coupled to the outputs of the first and the second IF channels for demodulating and processing the first and the second IF signals;

wherein said first IF channel is coupled to the output of said front end stage through the wide band IF filter of the second IF channel; and the processors are configured to process the first and the second IF signals simultaneously.

2. A multi-mode receiver according to claim 1, wherein said first IF channel includes one or more stages for amplifying pulse amplitude modulated signals.

3. A multi-mode receiver according to claim 1, wherein said first IF channel includes one or more stages for amplifying and limiting phase shift keyed signals.

4. A multi-mode receiver according to claim 1, wherein said second IF channel includes one or more stages for amplifying and limiting spread spectrum modulated signals.

5. A multi-mode receiver according to claim 1, wherein said second IF channel includes one or more stages for producing digitized signals in response to analog spread spectrum signals applied to an input of the second IF channel.

6. A multi-mode receiver according to claim 5, wherein the stages of the second IF channel include a quadrature demodulator, and a pair of matched digital filters coupled to corresponding outputs of the demodulator.

7. A multi-mode receiver according to claim 1, wherein the wide band RF filter of said preselector has a 3-dB bandwidth of about 20 MHz.

8. A multi-mode receiver according to claim 1, wherein the pass band of the wide band RF filter of said preselector is centered at about 1030 MHz.

9. A multi-mode receiver according to claim 8, wherein said wide band RF filter has about 65 dB rejection for RF signals at 1008 MHz and at 1052 MHz.

10. A multi-mode receiver according to claim 1, wherein the narrow band IF filter of the first channel has a 3-dB bandwidth of about 7.5 MHz.

11. A multi-mode receiver according to claim 10, wherein the narrow band IF filter has about 85 dB rejection at frequencies corresponding to RF signals at 1008 and 1052 MHz.

12. A multi-mode receiver according to claim 1, wherein the front end stage includes one or more overload limiting diodes operatively connected between said antenna input and the wide band RF filter of said preselector.

13. A multi-mode receiver according to claim 1, wherein the second IF channel comprises a limiter coupled to an output of the wide band IF filter, and the wide band IF filter is configured to reject potentially interfering signals by an amount sufficient to prevent the limiter from being captured by the interfering signals.

14. A multi-mode receiver according to claim 1, wherein the receiver forms part of an identification friend from foe (IFF) transponder.

15. A multi-mode receiver for detecting desired radio frequency (RF) signals having relatively wide and narrow bandwidths about a common RF center or carrier frequency, comprising:

a front end stage having an antenna input adapted to connect with an antenna responsive to signals over a RF band that includes the desired RF signals, a preselector for amplifying the signals input by the antenna and including a wide band RF filter having a pass band sufficient to pass both of the desired wide and narrow bandwidth signals about the center RF frequency, and a mixer for converting signals output by the preselector to frequencies within an intermediate frequency (IF) band;

a first IF channel coupled to an output of the front end stage and including a narrow band IF filter having a pass band of sufficient width for passing first IF signals corresponding to the desired narrow bandwidth signals, while rejecting signals corresponding to undesired interfering signals at frequencies in the vicinity of the desired narrow bandwidth signals;

a second IF channel coupled to the output of the front end stage and having a web band IF filter with a pass band of sufficient width for passing second IF signals corresponding to the desired wide bandwidth signals; and a processor coupled to the first and the second IF channels for demodulating and processing the first and the second IF signals;

wherein the second IF channel comprises a limiter coupled to an output of the wide band IF filter, and the wide band IF filter is configured to reject potentially interfering signals by an amount sufficient to prevent the limiter from being captured by the interfering signals.

16. A multi-mode receiver according to claim 15, wherein the front end stage includes one or more overload limiting diodes operatively connected between said antenna input and the wide band RF filter of said preselector.

17. A multi-mode receiver according to claim 15, wherein said second IF channel includes one or more stages for amplifying and limiting spread spectrum modulated signals.

18. A multi-mode receiver according to claim 15, wherein the wide band RF filter of said preselector has a 3 dB bandwidth of about 20 MHz.

19. A multi-mode receiver according to claim 15, wherein said second IF channel includes one or more stages for producing digitized signals in response to analog spread spectrum signals applied to an input of the second IF channel.

20. A multi-mode receiver according to claim 19, wherein the stages of the second IF channel include a quature demodulator, and a pair of matched digital filters coupled to corresponding outputs of the demodulator.

21. A multi-mode receiver according to claim 15, wherein the process or includes one or more processor stages that are configured to process the first and the second IF signals simultaneously.

22. A multi-mode receiver according to claim 15, wherein the receiver forms part of an identification friend from foe (IFF) transponder.

* * * * *